United States Patent [19]
Zagar

[11] 3,800,636
[45] Apr. 2, 1974

[54] CONCRETE FRAME MACHINES

[76] Inventor: Frank G. Zagar, 19930 Edge Cliff Dr., Euclid, Ohio 44119

[22] Filed: Oct. 13, 1972

[21] Appl. No.: 297,402

[52] U.S. Cl.......................... 82/32, 248/19, 408/234, 425/111, 29/452
[51] Int. Cl............................................ B23b 17/00
[58] Field of Search............ 82/32; 52/223; 248/19, 248/2; 29/452; 408/234; 425/111; 264/228

[56] References Cited
UNITED STATES PATENTS

| | | | |
|---|---|---|---|
| 1,096,881 | 5/1914 | Wyatt | 408/234 |
| 3,264,905 | 8/1966 | Erikson | 408/234 |
| 2,971,295 | 2/1961 | Reynolds | 248/19 X |
| 1,399,199 | 12/1921 | Eades | 82/32 X |
| 2,010,557 | 8/1935 | Nenninger et al. | 82/32 X |
| 3,348,795 | 10/1967 | Schilling | 248/19 |

*Primary Examiner*—Leonidas Vlachos
*Attorney, Agent, or Firm*—McNenny, Farrington, Pearne & Gordon

[57] ABSTRACT

A machine tool frame mounts and carries machine tool components which face each other with a working space between them. The frame is made of compression reinforced concrete. The compression reinforcement establishes compression preloading in the frame between the machine tool components and partly around the working space.

6 Claims, 19 Drawing Figures

CONCRETE FRAME MACHINES

FIELD OF THE INVENTION

The present invention relates to machine tools and frames for machine tools.

DESCRIPTION OF THE PRIOR ART

Machine tool components of the prior art have generally been carried on metal frames fabricated from cast, rolled and/or otherwise formed steel, cast iron and/or other metals. Concrete has been used as a filler for a machine base in which arbor supporting members are embedded, as in U.S. Pat. No. 2,398,239. Monolithic reinforced concrete has been used as a foundation, bed, or base for machine tools. One example is found in U.S. Pat. No. 2,370,384. The use of compression reinforcing in concrete beams and footings is also known. Compression reinforced concrete beams are discussed in the Encyclopedia of Science and Technology, Vol. 10, McGraw-Hill, 1971 Ed. An example of compression reinforced footing is shown in U.S. Pat. No. 2,971,295.

SUMMARY OF THE INVENTION

The present invention makes possible greater versatility in machine tool design, and in some applications enables substantial cost savings to be realized in the construction, reconstruction, installation, and/or reinstallation of machine tools. Machine tools of larger sizes whose costs have been prohibitive without the invention become practical, although the invention is also applicable in many aspects to smaller machine tools.

The invention provides machine tools having frames of compression reinforced concrete. Unlike the compression reinforcing in prestressed concrete beams or footings, the compression reinforcing in the invention is not limited to the reach along a beam or slab, or like member, but rather extends partly around a working space between machine tool components mounted and carried by the frame to establish compression preloading at least partly around the working space. Tensile stressing of the concrete incident to operation of the machine is thereby counteracted in whole or in part.

The frames contemplated by the invention may be formed at the tool installation site, thereby avoiding the problem and expense of transporting massive tool constructions from the tool factory to the installation site. This is particularly appropriate for massive or outsized machine tools. Steel plates or like mountings for the machine tool components or for slides or the like may be accurately located and may be spaced from each other around the working space. They may be bolted down to anchoring means cast into the concrete. Locating pin sockets means may also be cast into the concrete.

THE DRAWINGS

In the drawings, all of which are somewhat schematic:

Figure 2:
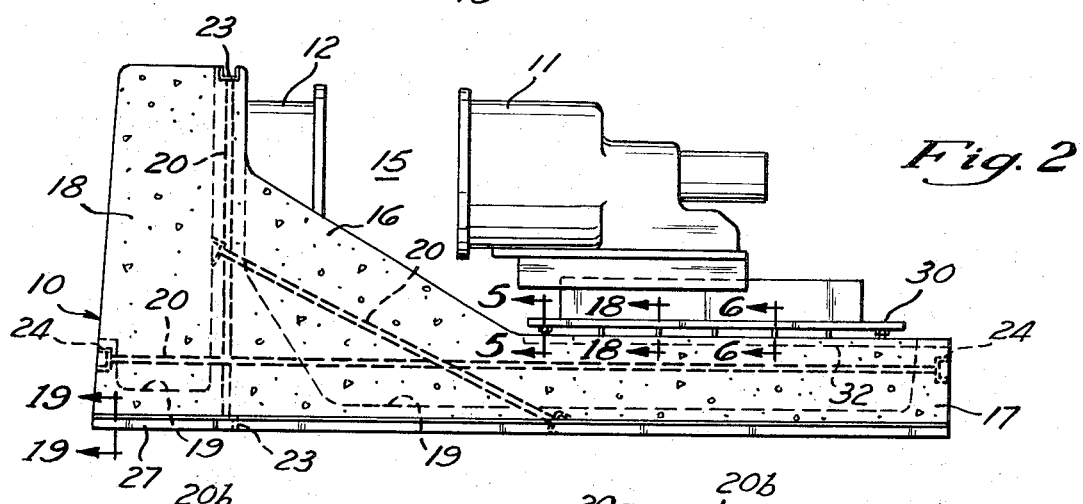
Figure 5:
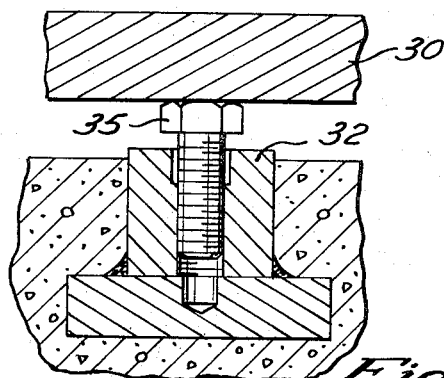
Figure 6:
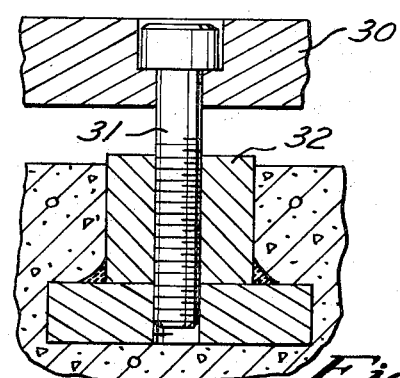

FIGS. 5 and 6 are cross-sectional detail drawings on a similarly enlarged scale taken on the planes of lines 5—5 and 6—6 in FIG. 2.

Figure 7:
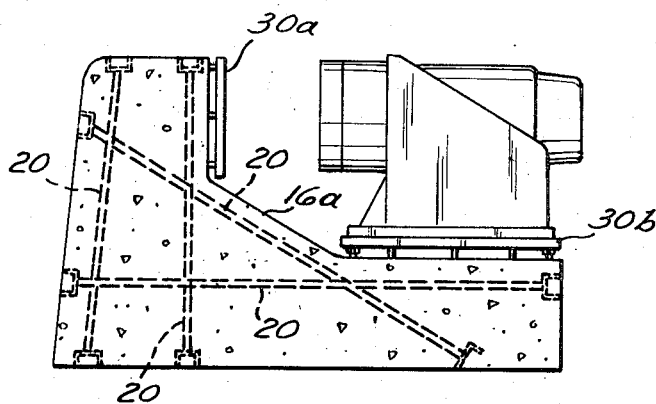

FIG. 7 is a side elevational view of another horizontal spindle machine embodying the invention.

Figure 8:
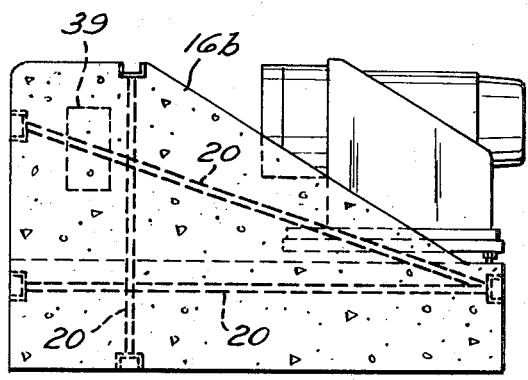
Figure 9:
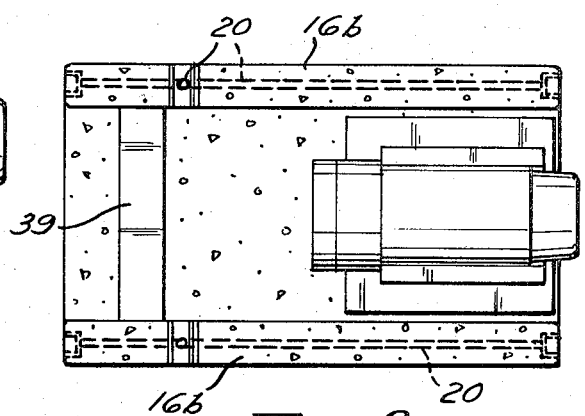

FIGS. 8 and 9 are respectively side elevational and plan views of still another horizontal spindle machine embodying the invention.

Figure 10:
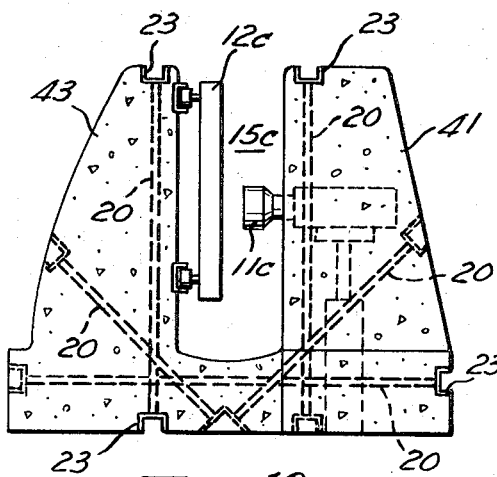
Figure 11:
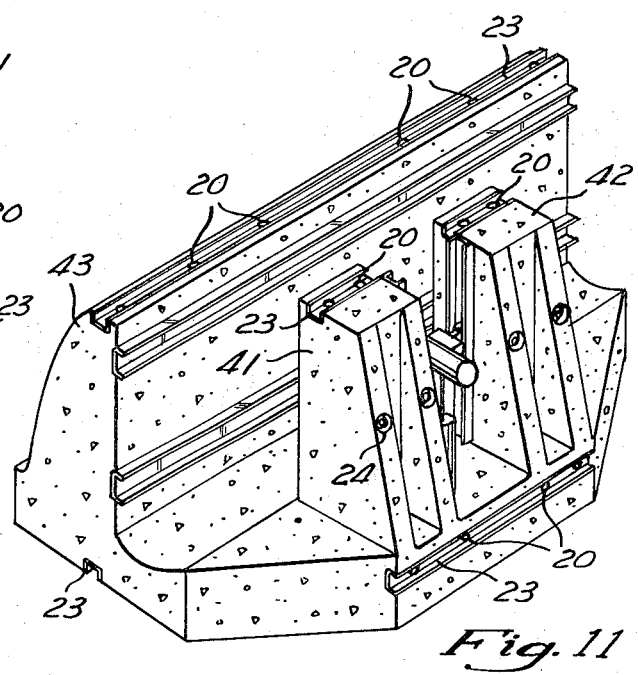

FIGS. 10 and 11 are respectively side elevational and isometric views of another horizontal spindle machine embodying the invention.

Figure 12:
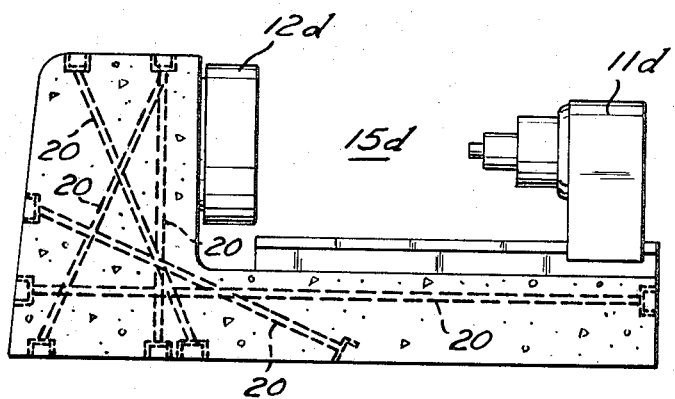

FIG. 12 is a side elevational view of a lathe type machine embodying the invention.

Figure 13:
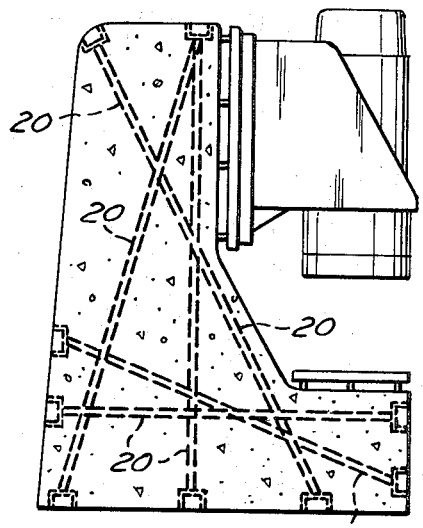

FIG. 13 is a side elevational view of a vertical spindle machine embodying the invention.

Figure 14:
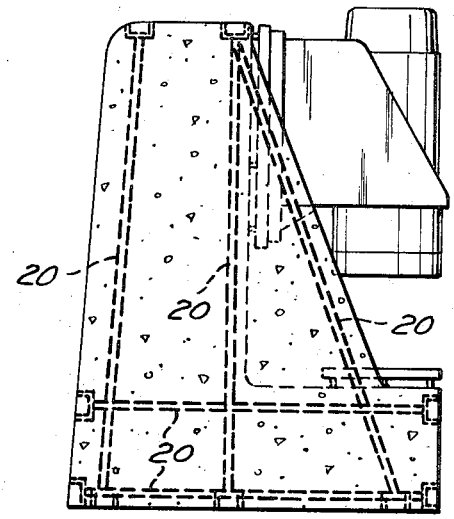

FIG. 14 is a side elevational view of another vertical spindle machine embodying the invention.

Figure 15:
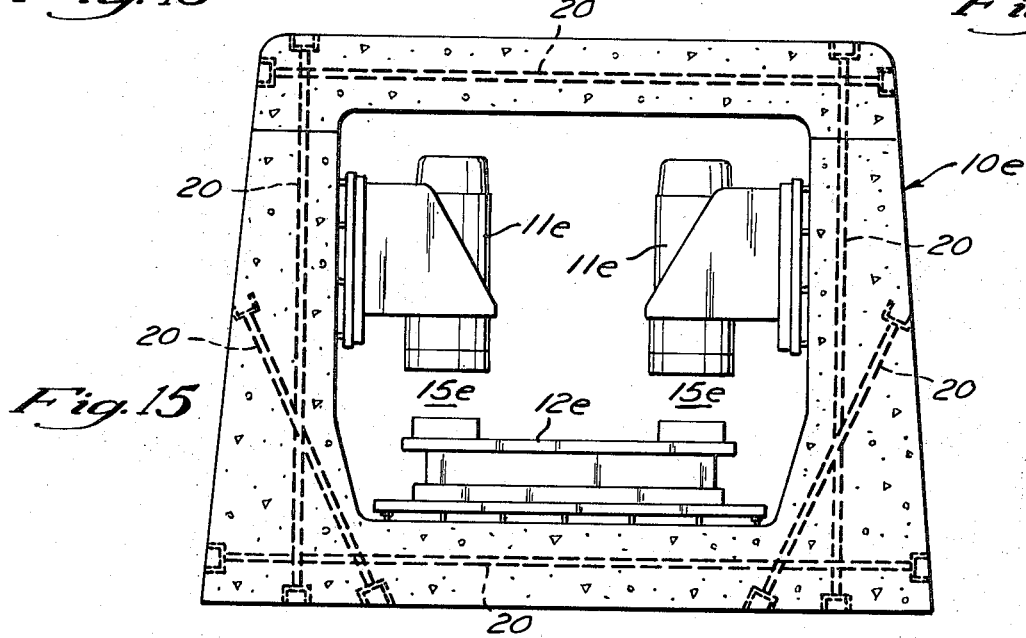

FIG. 15 is a side elevational view of a multiple unit indexing vertical machine embodying the invention.

Figure 16:
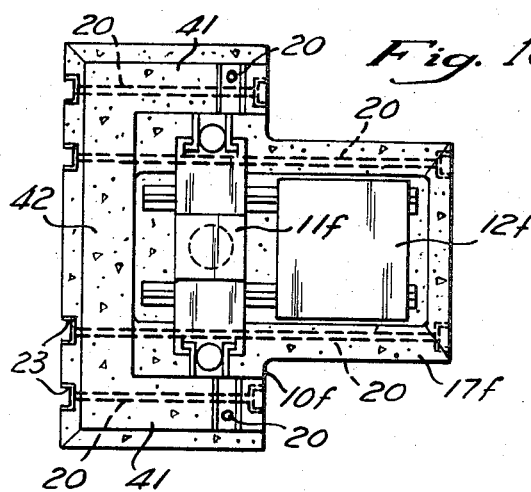
Figure 17:
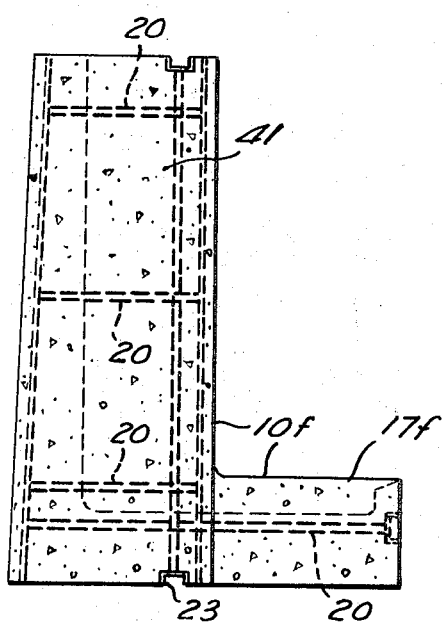

FIGS. 16 and 17 are respectively plan and side elevational views of another vertical machine where the spindle is carried between shoes.

Figure 18:
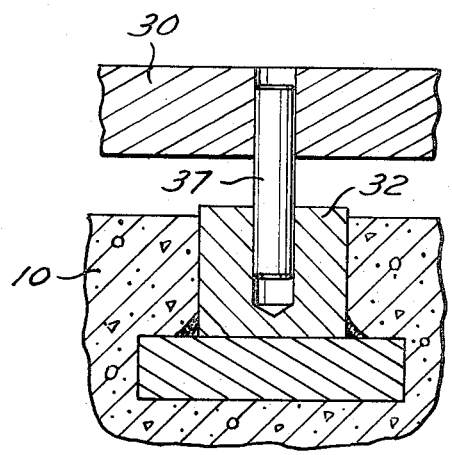
Figure 19:
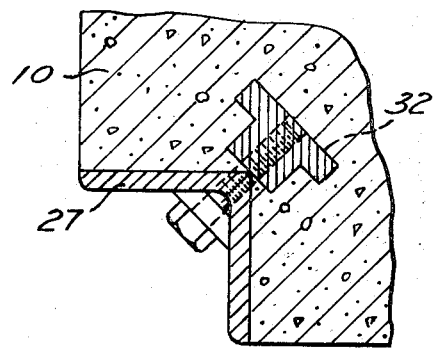

FIGS. 18 and 19 are cross-sectional detail drawings on an enlarged scale taken on the planes 18—18 and 19—19 of FIG. 2.

DESCRIPTION OF EMBODIMENTS OF THE INVENTION

To make a machine tool according to the invention, a concrete frame and machine tool components are provided and the concrete is compression reinforced to establish compression loading in the frame, between the components and partly around the working space of the machine, which approaches or exceeds the maximum tension loading on the frame between the components under operating conditions.

When the machine is then operated, the resulting tension loading around the working space and through the frame between the machine components wholly or partly relieves the just-mentioned compression loading of the concrete, and the tension loading around the working space and through the frame is thus absorbed by such relieving process and therefore causes relatively little or no tension loading of the concrete itself.

The machine tool components between which compression loading in the frame is established may for example be a drill head or other machining head, a power head, a table or other workholder, a headstock, a tailstock, a toolholder, or any other machine component, or a combination of any two or more of the foregoing.

Figure 1:
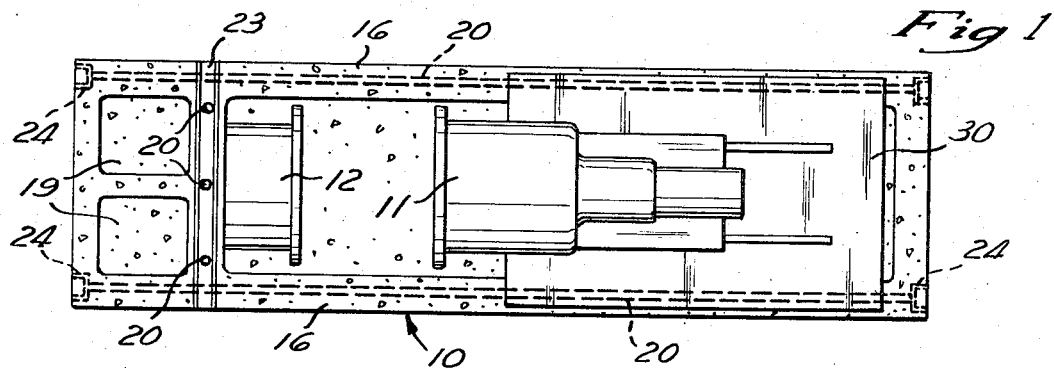
FIGS. 1 and 2 are respectively plan and side elevational views of a horizontal drilling machine embodying the invention.

The horizontal drilling machine shown in FIGS. 1 and 2 is made and operates in the manner just described. It comprises a frame generally indicated at 10 mounting and carrying machine tool components 11 and 12 which face each other with a working space 15 between them. The frame 10 is made of compression reinforced concrete. The compression is imposed by tension members such as steel rods or single strand or multiple strand steel cables, all of which form of tensioning members are hereafter for convenience referred to as merely "rods."

Figure 3:
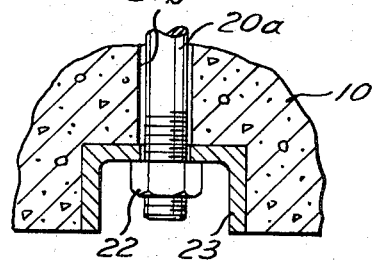
FIGS. 3 and 4 are cross-sectional detail drawings on an enlarged scale illustrating details which may be used in embodiments of the invention.
Figure 4:
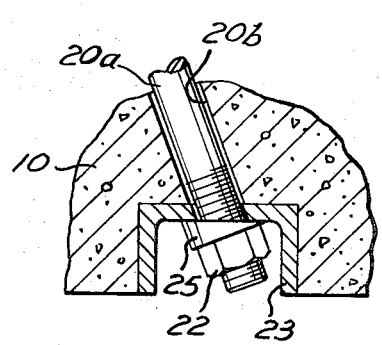

In the detail cross sections of FIGS. 3 and 4 the rods are illustrated as solid rods 20a received within conduits 20b which may be slightly spaced radially from the rods or may simply correspond to the interior diameter of the cast concrete which immediately surrounds the rods. In FIGS. 3 and 4 the conduits 20b are shown as slightly greater in diameter than the rods themselves. FIGS. 3 and 4 are not specific to the embodiment of FIGS. 1 and 2 but are typical cross sections applicable to the various embodiments of the invention illustrated in the drawings.

The locii of the rods 20a and conduits 20b are generally indicated in the various illustrations of the embodiments by the reference numeral 20. This and the remainder of this description, when "rods 20" are referred to it will be understood that reference is had to the rods themselves or to the locii of the rods if the rods themselves are not illustrated in a particular drawing. Generally the drawings illustrate only the locii of the rods by illustrating only the conduits in which the rods are located. This is done in order to simplify the drawings.

The compression reinforced concrete of the embodiment of FIGS. 1 and 2 and of the other embodiments may be pretensioned, but is preferably posttensioned. While in pretensioning the rods would be tensioned before the concrete is poured, or at least before it sets, in the preferred post-tensioning, the concrete is allowed to set and then high rod tension is established by tightening end anchoring nuts 22 which are shown in FIGS. 3 and 4 but are omitted from the illustrations of most of the embodiments to simplify the drawings. The end nuts 22 bear against preferably recessed members such as channels 23 or cup-shaped end plates 24 similar in cross-sectional shape to the retainers 23. Where the associated rod is angularly oriented with respect to the cup or channel, as in FIG. 4, suitable bearing washers such as the washer 25 shown in FIG. 4 may be provided. Special shapes of end members may be provided, as desired.

In order to allow the concrete to set without being anchored to the rods, the rods may be provided with release coatings (not shown) of grease, soft wax, paraffin, or any coating which will permit longitudinal movement of the rod after the concrete has set. Such provision of release coatings for posttensioned rods in compression reinforced concrete is disclosed in U.S. Pat. No. 2,971,295. When provision of a release coating is not feasible, or where the release action may not be adequate, as where long rod length prevents release and longitudinal movement of the rod relative to the concrete after the concrete has set, or where the tensioning "rod" is in the form of multiple strand cable which through mechanical interference tends to become interlocked with the concrete, a lined or unlined conduit, such as the previously described unlined conduit 20b, may be formed in the concrete to receive the rod in slightly spaced radial relationship therewith. The conduit may be formed by casting the concrete around a bar or tube which is removable at some stage in the setting of the concrete at which the concrete has sufficient strength to withstand such removal without unduly disturbing the shape of the conduit. Lined conduits may be formed by tubing (not shown) around which the concrete is poured. In some instances, the rod itself may provide the form for the conduit even without provision of a release coating, as where by shifting the rod during setting of the concrete or by other means anchoring of the rod in the concrete prior to tensioning is prevented.

In the embodiment of FIGS. 1 and 2, the machine tool component 12 is fixed to the frame 10 in any suitable manner, such as by mounting bolts (not shown) received in nuts or other tapped members (not shown) buried within and anchored within the concrete. The frame may be cast with the nuts held in place on their mounting bolts, which can subsequently be turned out of engagement with the nuts and removed after the concrete has set. The mounting bolts can be used to anchor the machine tool component in place. Other suitable anchoring means may be employed.

A carriage for the machine tool component 11 may be supported on a mounting plate 30 which is anchored to the frame 10 by bolts 31 (FIG. 6) received in a suitable tapped T rail 32 which is buried in the concrete. Leveling screws 35 (FIG. 5) are provided for leveling the mounting plate 30 as desired. Locating pins 37 (FIG. 18) may also be provided. These bolts, leveling screws and locating pins are omitted in the plan view of FIG. 1 for simplicity of illustration. An angle iron 27 may be bolted to an additional T-rail 32 at each lower edge of the frame 10, as best seen in FIG. 19, to protect the frame against chipping and provide for use of jacks, lift bars and the like.

In the embodiment of FIGS. 1 and 2, the concrete frame includes side-wall portions or massive parallel webs 16 which partly surround the working space 15 and contain the two rods 20 which are illustrated in a slanted orientation. These particular rods load the sidewalls with compression loading which, when the end nuts associated with these rods are sufficiently tightened down, approaches or exceeds the tension loading to be borne through the walls during machine operation. Under some conditions these two rods 20 alone provide sufficient compression loading within the frame to enable the tool to function usefully even without provision of the additional vertical and horizontal rods 20 illustrated in FIGS. 1 and 2. However the additional rods better establish compression preloading in the frame between the machine components and around the working space.

The reinforced concrete frame in FIGS. 1 and 2 will be seen to comprise a base 17 and pier means 18 upstanding from the base. The webs 16 form part of the pier 18, and the slanted rods 20 extend within the webs 16. The pier 18 will be seen to mount and carry the machine tool component 12 while the other machine tool component 11 is mounted and carried on the base 17 at a location laterally removed from the mounting of the machine tool component 12. The slanted rods 20 will be seen to extend from an elevated location that is associated with the mounting of the component 12 on the pier means 18 toward a location on the base 17 laterally removed from the mounting of the component 12 on the pier means 18.

Various bays or troughs 19 which may communicate with each other through openings (not shown) in the wall portions between them may serve to collect chips, and collect and in part circulate coolant to a suitable pickup point for a recirculating pump (not shown).

The concrete frame 10 may be formed in a suitable mold of plywood or the like. The T-rails 32, and any other members which are to receive tie down bolts, leveling screws, locating pins or the like may be similarly temporarily supported on screws or pins projecting from the mold wall. The mold may be vibrated to aid in even distribution of the concrete. Unstressed reinforcing rods (not shown) may be liberally distributed through the body of the reinforced concrete frame 10 by positioning such rods as desired prior to pouring of the concrete. Rather than being poured, the concrete may be pressure injected into a suitable mold form by conventional concrete injection techniques.

FIGS. 7 to 17 illustrate other embodiments of the invention. A machine tool shown in FIG. 7 is generally similar to that shown in FIGS. 1 and 2. In FIG. 7 the machine tool component that is carried on the pier may comprise a mounting plate 30a which functions as a workholder or workholder mounting. The mounting plate 30a may be similar to the mounting plate 30 of FIG. 2. An additional mounting plate 30b is provided for the other machine component. Web 16a is one of a pair of webs generally similar to the webs 16 of FIGS. 1 and 2. The rods 20 that slant through the webs 16a are desirably located near to the web edge to better resist the tension loads imposed when the machine is operating. The additional rods 20 aid in better establishing compression preloading in the frame between the machine components and around the working space.

The compression preloading imposed by some of the tensioned rods may itself induce tensile stresses in portions of the concrete frame. To the extent required, tensile stresses induced by reaction to compression loading as just mentioned may in turn be counteracted by additional compression loading of the frame. Thus in FIG. 7, tensioning of the rods 20 that pass through the webs 16a may impose tensile stresses parallel to the left hand lower side surface of the pier. To counteract these stresses, the rod 20 that slants upwardly parallel to the left side of the pier is provided.

FIGS. 8 and 9 illustrate an embodiment in which one of the machine tool components comprises a workholder (not shown) carried by a cross member 39 between a pair of parallel webs 16b.

FIGS. 10 and 11 illustrate a machine tool where a first tool component 11c is carried on heavy rails between pier members 41 and 42 and the other machine tool component 12c (omitted from FIG. 11), a workholding table, is carried on horizontal rails on a pier 43. The working space 15c is defined between the machine tool components 11c and 12c. The rods 20 establish compression preloading in the illustrated frame between the machine tool components and partly around the working space 15c. This design may be adopted for a very large scale machine used to machine a very large workpiece.

In FIG. 12 the machine tool components 11d and 12d comprise the headstock and tailstock components of a lathe. Most of the rods 20 maintain compression preloading in the frame around the working space 15d. The rod 20 that slants from lower left to upper right counteracts tensile forces, induced by reaction to compression loading of some of the other rods.

In the vertical machines shown in FIGS. 13 and 14 the majority of the rods 20 again contribute to compression preloading in the frame between the machine tool components and partly around the working spaces. However some of the tension rods counteract tensile stresses induced by the primary compression loading.

FIG. 15 illustrates a multiple unit indexing vertical machine where the indexing table 12e is one component of each tool and is opposed by multiple machine tool components 11e to define the work spaces 15e. The frame 10e is closed as illustrated. Again the rods 20 establish compression preloading in the frame between the components 11e on the one hand and the component 12e on the other hand, such compression preloading extending partly around the working spaces.

In FIGS. 16 and 17 one machine tool component 11f comprises a spindle that is carried between shoes or slides that extend vertically on sideward located upstanding walls 41. A massive rear wall 42 is also provided. The other machine tool component 12f is carried on rails supported on the base projection 17f of the overall frame 10f. The machine tool components are shown only in plan view. This embodiment illustrates the great versatility of machine design that the invention lends itself to.

The illustrated examples of the invention will suggest variations to machine tool designers. Indeed the invention should be applicable to an almost unlimited variety of machine tool configurations.

What is claimed is:

1. A machine tool comprising a frame mounting and carrying machine tool components which face each other with a working space between them, said frame extending partially around said working spaced, said frame comprising compression reinforced concrete and compression means therefor, the frame being compression loaded between said components and partially around said working space by said compression means, said compression preloading approaching or exceeding the maximum tension loading of said frame between said components under operating conditions.

2. A machine tool comprising a frame mounting and carrying machine tool components which face each other with a working space between them, the frame comprising reinforced concrete and including means for bearing machine-operation-generated tension loads, said means including concrete walls at least partly surrounding the working space, and compression means loading said walls with compression loading which approaches or exceeds the tension loading to be borne through the walls during machine operation.

3. A machine tool frame for holding machine tool components in relationship to one another comprising reinforced and compressed concrete structure comprising a base and pier means upstanding from the base, the pier means mounting and carrying at least one of said components, at least one other of said components being mounted and carried on the base or on other pier means at a location on the base laterally removed from said mounting of said at least one component on said first mentioned pier means and defining a working space therebetween, compression reinforcement means for said concrete comprising tension rods whose end portions are anchored to the concrete and whose middle portions are free of anchoring to the concrete, said tension rods extending, directly or in series, at least from an elevated location on said first mentioned pier means that is associated with said mounting of said one component toward said location on the base laterally removed from said mounting of said one component to thereby provide compression reinforcement at least partially around said working space.

4. A machine tool frame for holding machine tool components in relationship to one another comprising reinforced and compressed concrete structure comprising a base and pier means upstanding from the base, the pier means mounting and carrying at least one of said components, at least one other of said components being mounted and carried on the base or on other pier means at a location on the base laterally removed from said mounting of said at least one component on said first mentioned pier means and defining a working space therebetween, the pier means including massive parallel webs partially surrounding said at least one component and extending downwardly toward said location on the base laterally removed from said mounting of said at least one component, and compression reinforcement means within said webs and compressing them, in the idle condition of the machine tool, with a compressive force substantially no less than the tensile force to be carried by said webs under machine operating loads to thereby provide compression reinforcement at least partially around said working space.

5. A method of making a machine tool which comprises the steps of fabricating a machine tool frame and providing machine tool components in mounted and carried relationship therewith with the components facing each other with an open space between them at a working zone, including the steps of fabricating the frame of reinforced concrete and compression reinforcing the concrete, said last named step including emplacing compression means for the concrete in said frame between said components and partially around said working space and impressing compression loading in said frame between said components and partially around said working space by tensioning said compression means sufficiently to impress a compression loading which approaches or exceeds the maximum tension loading of said frame between said components under operating conditions.

6. A method of making a machine tool which comprises the steps of fabricating a machine tool frame of concrete and providing machine tool components in mounted and carried relationship therewith with the components facing each other with an open space between them at a working zone, providing tension members within the frame with the middle portions of the tension members being free of anchoring to the concrete, and tensioning the tension members, after the concrete has set for a period of time, to compress the concrete, at parts of the frame extending partly around the working space and that are to be under high tensile stress under machine operating loads, to the point where the concrete at such parts will remain untensioned or minimally tensioned even under machine operating loads.

* * * * *